No. 764,272. PATENTED JULY 5, 1904.
W. R. CUNNINGHAM.
BRICK OR TILE CUTTING MACHINE.
APPLICATION FILED NOV. 23, 1903.
NO MODEL. 8 SHEETS—SHEET 2.
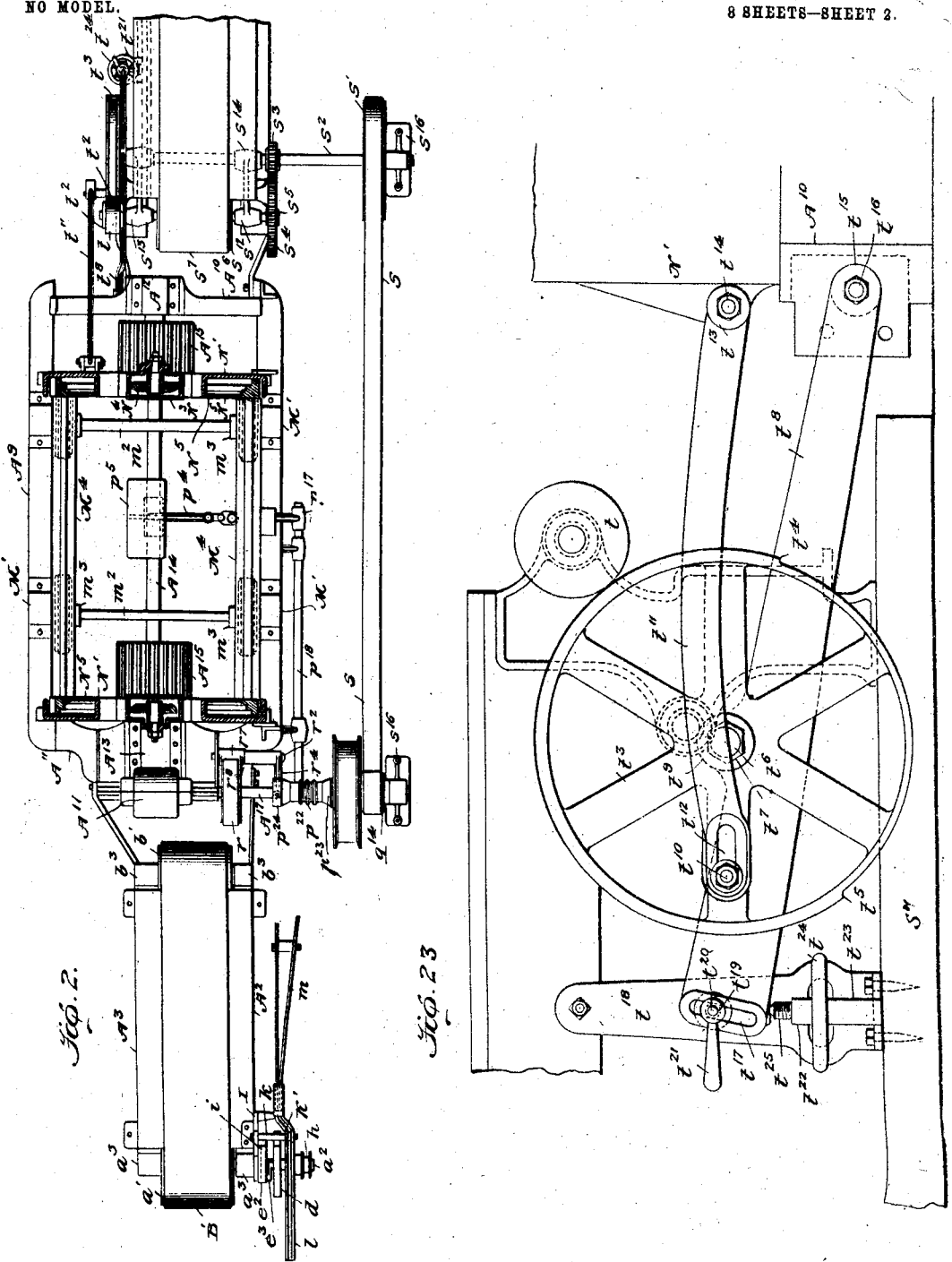

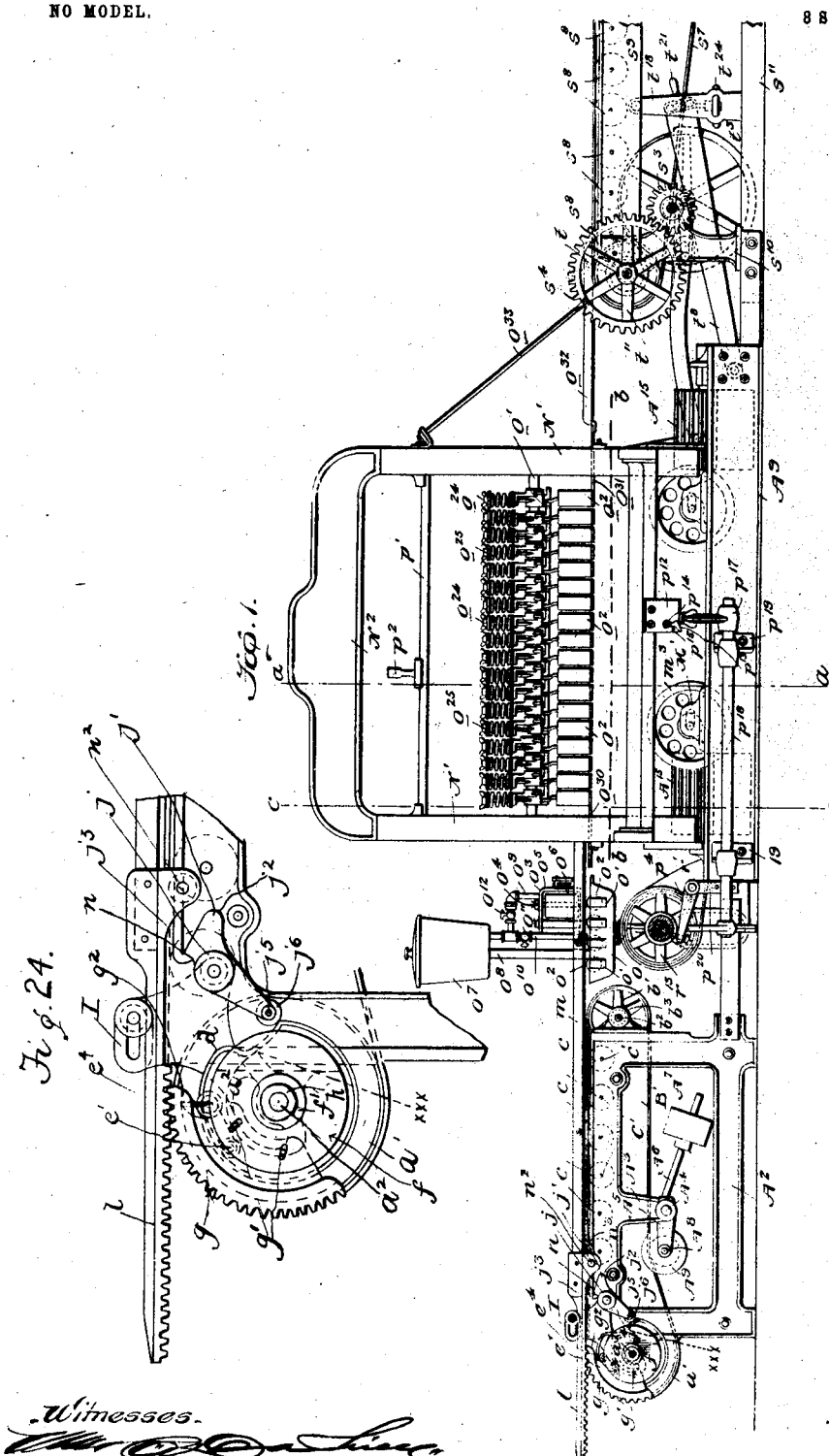

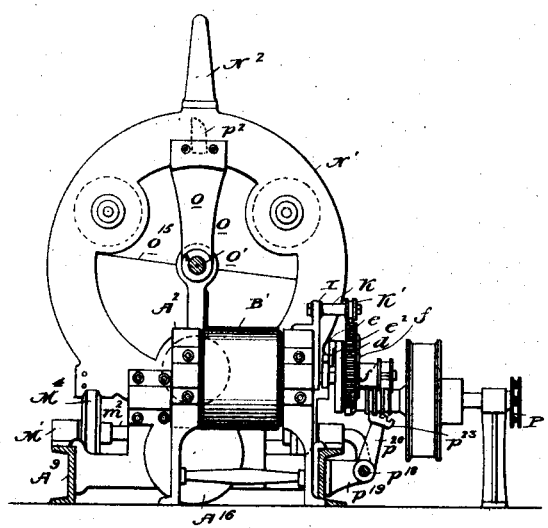

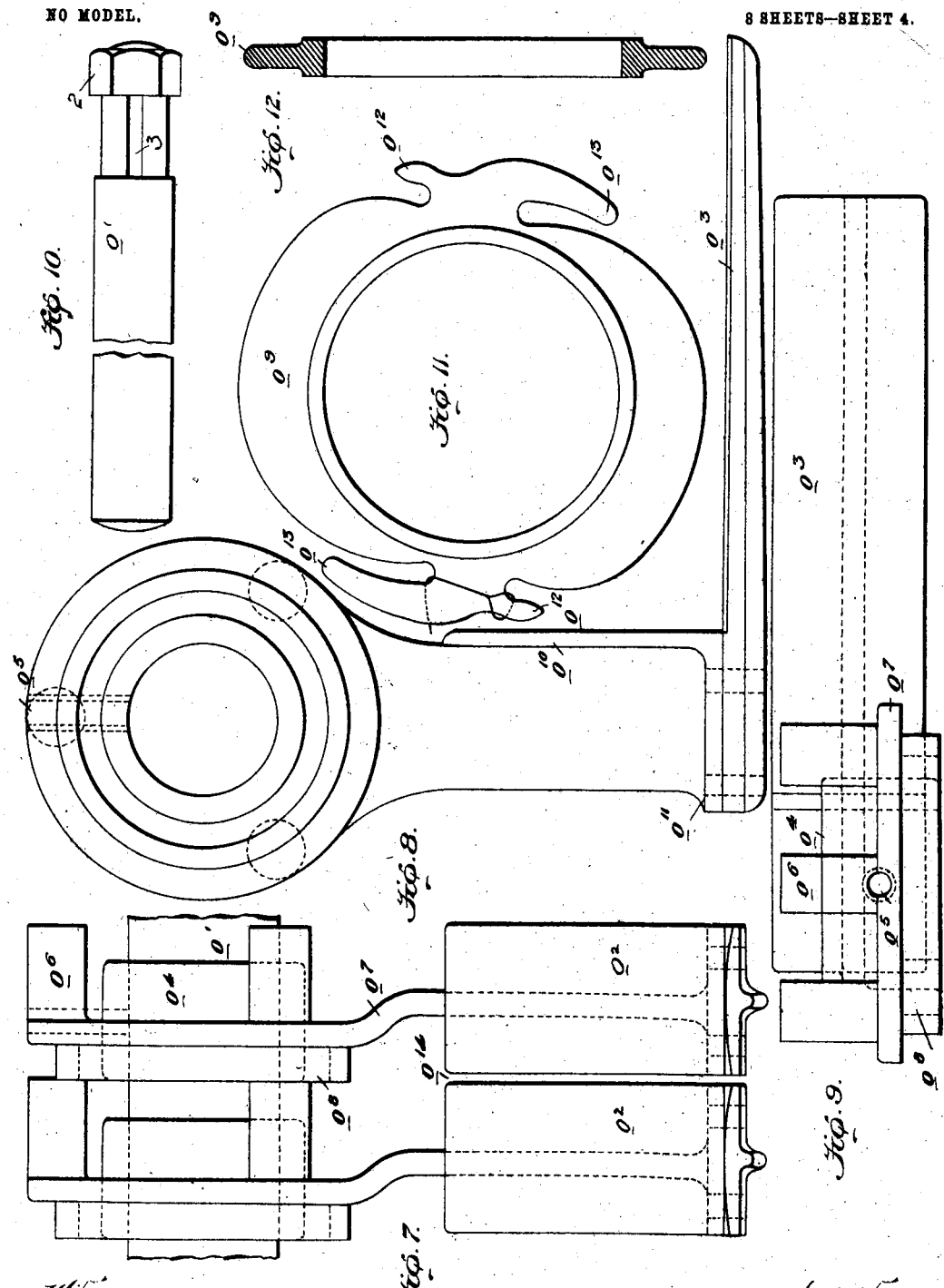

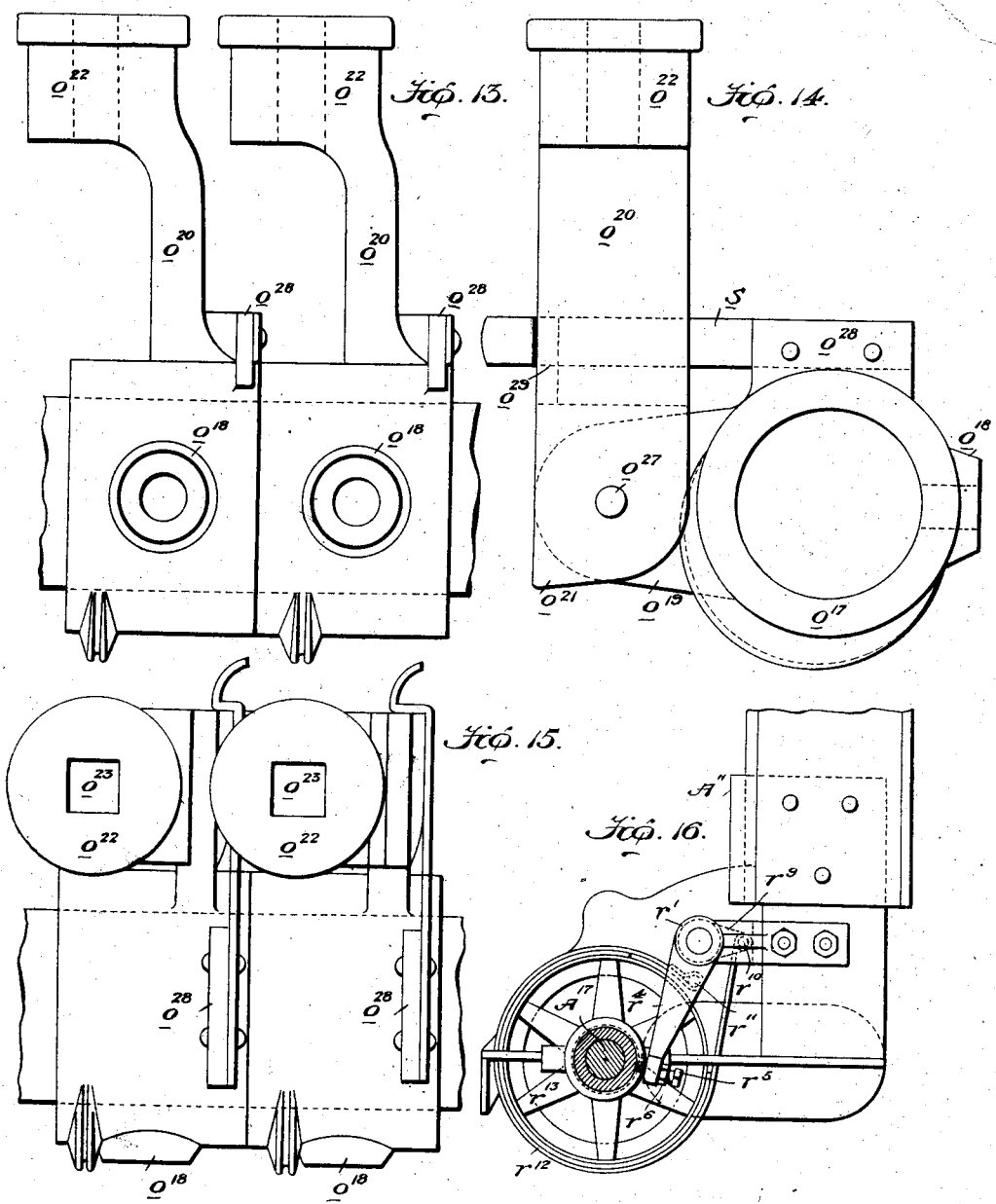

No. 764,272. PATENTED JULY 5, 1904.
W. R. CUNNINGHAM.
BRICK OR TILE CUTTING MACHINE.
APPLICATION FILED NOV. 23, 1903.
NO MODEL. 8 SHEETS—SHEET 6.
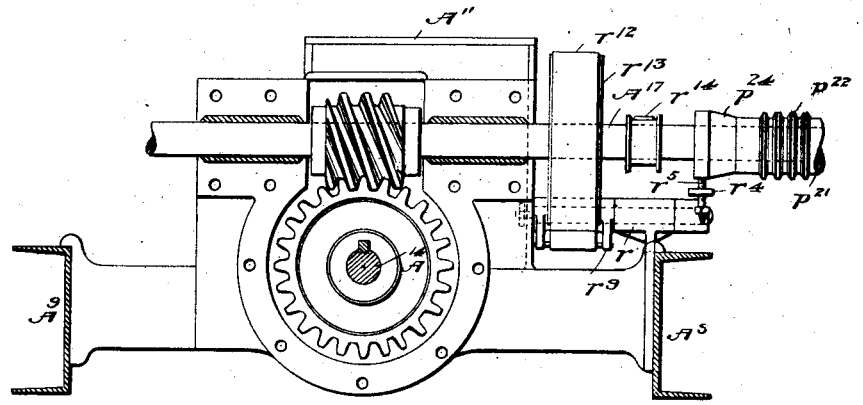
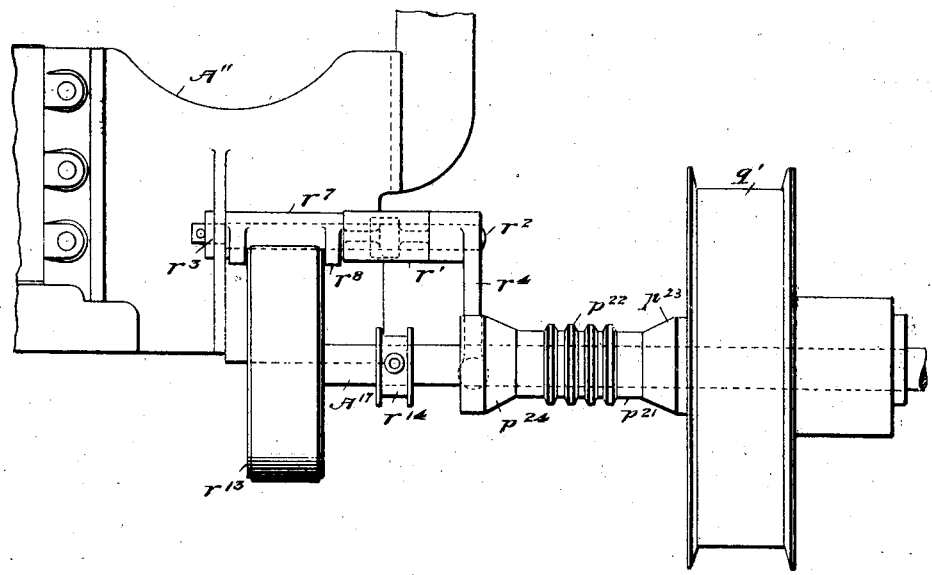
Witnesses. Inventor.
William R. Cunningham
by T. Walter Fowler
his Atty.

No. 764,272. PATENTED JULY 5, 1904.
W. R. CUNNINGHAM.
BRICK OR TILE CUTTING MACHINE.
APPLICATION FILED NOV. 23, 1903.
NO MODEL. 8 SHEETS—SHEET 7.
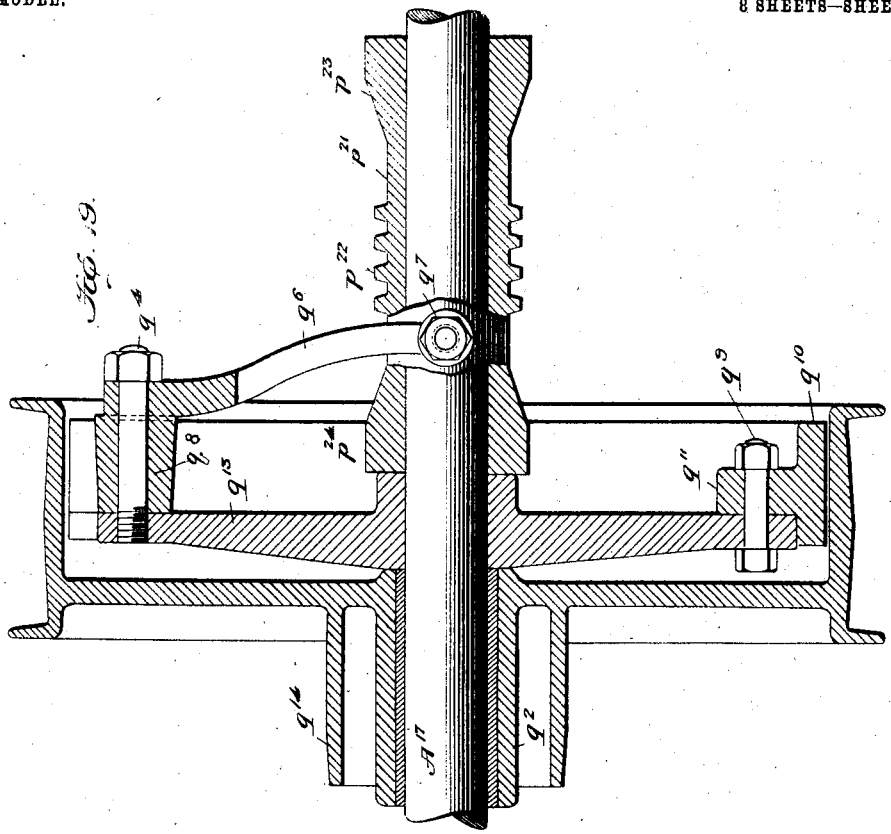
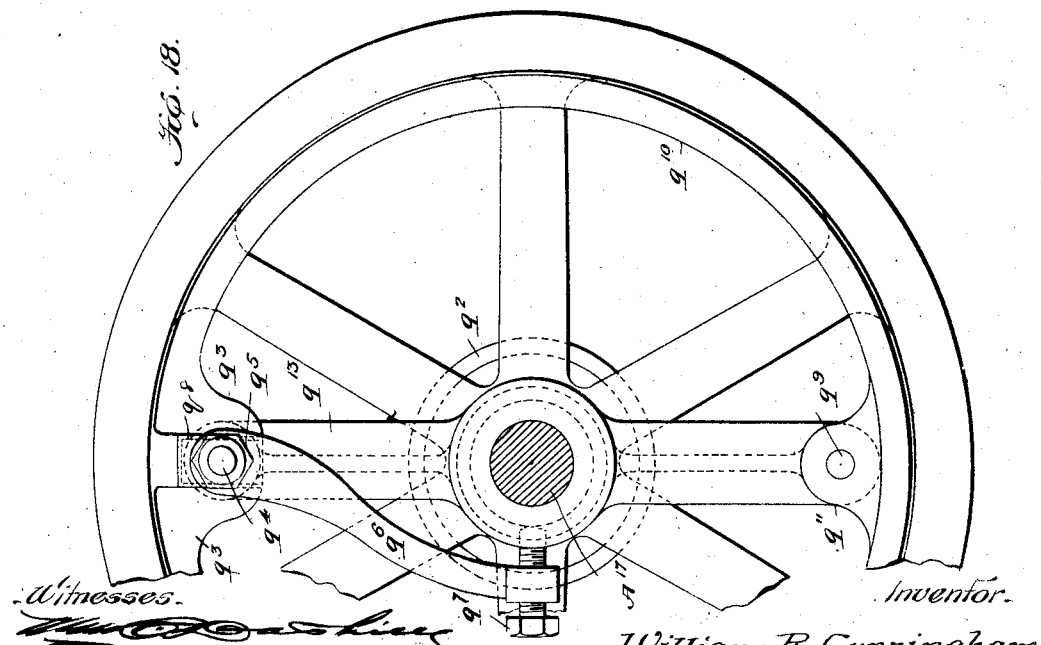
Witnesses. Inventor.
William R. Cunningham
By T. Walter Fowler
his Atty.

No. 764,272. PATENTED JULY 5, 1904.
W. R. CUNNINGHAM.
BRICK OR TILE CUTTING MACHINE.
APPLICATION FILED NOV. 23, 1903.
NO MODEL. 8 SHEETS—SHEET 8.
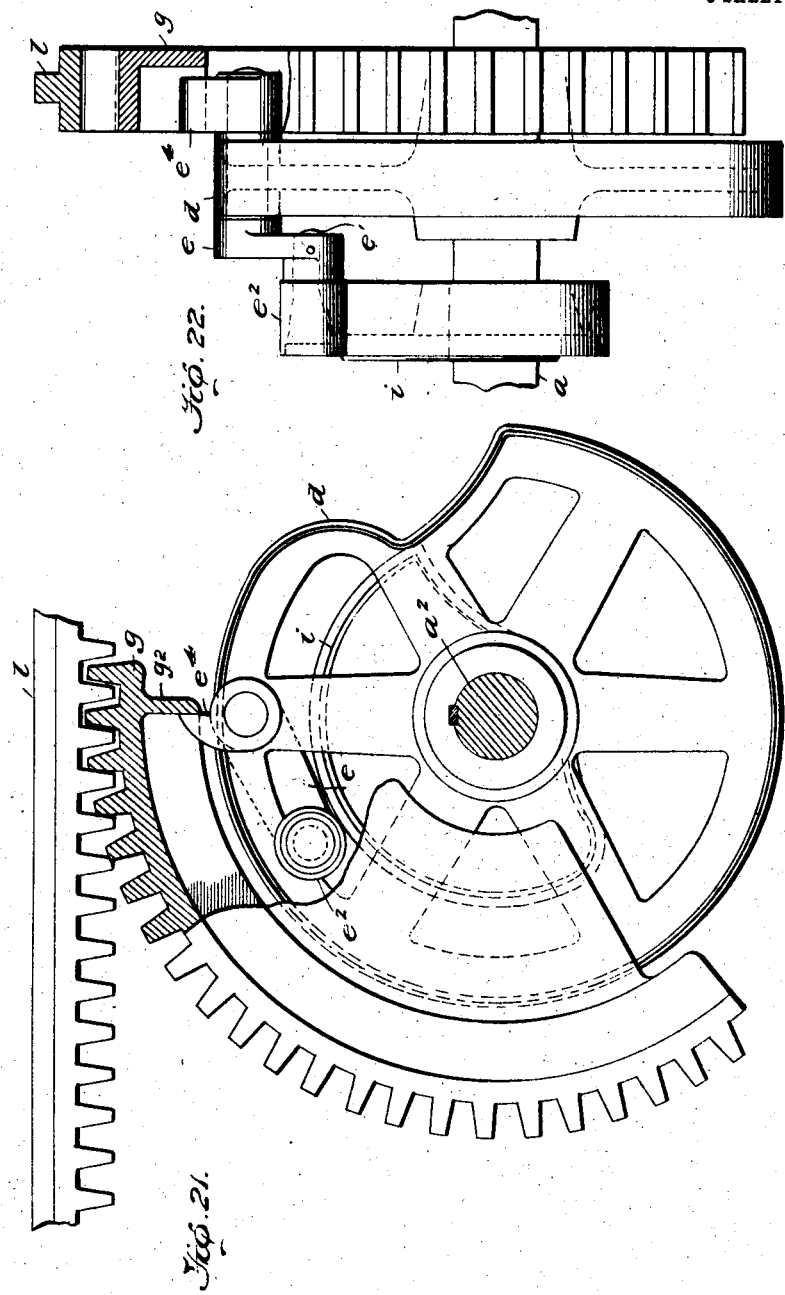
Witnesses — Inventor —
William R. Cunningham
by T. Walter Fowler
his Atty.

No. 764,272. Patented July 5, 1904.

UNITED STATES PATENT OFFICE.

WILLIAM R. CUNNINGHAM, OF BUCYRUS, OHIO, ASSIGNOR TO THE AMERICAN CLAY WORKING MACHINERY COMPANY, OF BUCYRUS, OHIO, A CORPORATION OF OHIO.

BRICK OR TILE CUTTING MACHINE.

SPECIFICATION forming part of Letters Patent No. 764,272, dated July 5, 1904.

Application filed November 23, 1903. Serial No. 182,302. (No model.)

*To all whom it may concern:*

Be it known that I, WILLIAM R. CUNNINGHAM, a citizen of the United States, residing at Bucyrus, in the county of Crawford and State of Ohio, have invented new and useful Improvements in Brick or Tile Cutting Machines, of which the following is a specification.

My invention relates to that class of machines designed for the purpose of cutting clay products of uniform thickness and length as they issue from the forming-die of the brick or tile machine.

This cutting-machine is practically formed of three divisions—one, nearest the brick-machine, known as a "measuring-table," another, located centrally of the combined machine, known as the "cutting" mechanism proper, and the third, at the delivery portion of the machine, being termed the "off-bearing" or "separating" table, the said measuring-table receiving the bar of clay as it emerges from the die of the brick-machine and adapted to deliver said bar to the cutting mechanism and the said cutting mechanism designed to sever the bar of clay into pieces of proper thickness and length and to then deliver the severed pieces to the separating-table, which receives, separates, and finally delivers said pieces a convenient distance from the machine for the operators to conveniently and expeditiously remove them and pack them on cars or other conveyances. The mechanism constituting the measuring-table is appropriately connected with the carriage of the cutting-table mechanism and is designed to keep the carriage in register with the travel of the column of clay while it is being severed into pieces which represent the bricks or tiles. The mechanism of the cutting-table is designed to operate the cutting appliances automatically, and the mechanism of the separating-table is adapted to return the carriage to its original or normal position after the cutting appliances have performed their work and to separate the severed pieces.

My invention consists of the parts and the constructions and combinations of parts, which I will hereinafter describe and claim.

In the accompanying drawings, forming part of the specification, and in which similar letters of reference indicate like parts throughout the several views, Figure 1 is a side elevation of a brick and tile cutting machine embodying my invention and showing a part of the separating-table broken away. Fig. 2 is a horizontal sectional view on the line $b\ b$ of Fig. 1 and a plan view of the clay-measuring devices and the separating-table. Fig. 3 is an end view looking toward the receiving end of Fig. 1. Fig. 4 is a cross-sectional view on the line $a\ a$ of Fig. 1. Fig. 5 is a cross-sectional view on the line $c\ c$ of Fig. 1, showing parts broken away. Fig. 6 is a longitudinal section on the line $e\ e$ of Fig. 5, showing a part of one end of the carriage with its geared ring and long driving-pulley. Figs. 7, 8, 9, and 10 are details of the push-boards and platens and their adjuncts. Fig. 11 is a detail of one of the wire-carrying rings. Fig. 12 is a cross-section of Fig. 11. Figs. 13, 14, and 15 are details of the wire-tightening devices. Figs. 16 and 17 are enlarged details of the brake and showing the friction-clutch in relation thereto. Fig. 18 is a plan view of the friction-pulley. Fig. 19 is a longitudinal sectional view of Fig. 18. Fig. 20 is a detail showing the worm-gear connection. Figs. 21 and 22 are enlarged views of the cam mechanism for operating the rack-bar. Fig. 23 is an enlarged view of the mechanism for returning the carriage. Fig. 24 is an enlarged view of the measuring-drum mechanism.

The frame $A^2$ of the measuring-table is of any well-known and appropriate design and construction, and in one end of this frame adjacent to the discharge of the brick or tile machine is mounted a measuring-drum $a'$, the circumference of which is preferably about equal to the length of the bar or column of clay necessary to be cut into the several parts or subdivided to form the individual bricks or tiles. The drum $a'$ is suitably mounted upon a shaft $a^2$, extending transversely across the receiving end of the measuring-table and journaled in antifriction-bearings $a^3$, which are bolted to the main frame. The measuring-drum is located proximate to the usual die (not shown) of a brick-machine, and at the opposite end of the measuring-table and appropriately mounted upon a shaft $b^2$, supported in bearings $b^3$, bolted to the main frame, is a second drum $b'$, said drums $a'$ and $b'$ receiving the measuring-belt B', the intermediate portions of which are appropriately supported by a series of transverse horizontal rollers $c$, provided with gudgeons or pins $c'$, supported in bearings which form a part of the main frame.

On the shaft $a^2$ of the drum $a'$ is keyed or otherwise fixed a cam $d$, on which is mounted the register-dog mechanism, which consists of a crank-shaft $e$, having a pin provided with a roller $e^2$, and on the said crank-shaft, which passes through the cam $d$, and on the opposite side from the crank is a register-dog $c^4$. (Shown in dotted lines in Fig. 1.)

Loosely mounted on the shaft $a^2$ is a flange $f$, having a suitable hub $f'$, to which flange is bolted or otherwise fixed a segmental gear $g$, provided with elongated holes or slots $g'$, thereby permitting the gear $g$ and the flange $f$ to be bolted together and at the same time permitting an adjustment of one of these parts relative to the other. On the inner periphery of the segmental gear is a stud or projection $g^2$, and the flange $f$ is held in its proper position by the cam $d$ and a set-collar $h$, as shown. To the main frame is also secured a hanger I, and to this hanger is bolted or fixed a stationary cam $i$, provided with slots or elongated holes to enable it to be adjusted to its proper position, said cam $i$ operating the crank-shaft $e$ by forming a track for the roller $e^2$ thereof.

The hanger I is provided with a stud $j$, on which is mounted the holdback-dog $j'$, which is constructed or provided with a balance-weight portion $j^2$ and a hook portion $j^3$, said dog $j'$ having also an arm $j^4$, at the lower end of which is a wrist-pin $j^5$, on which is mounted a roller $j^6$, operated by the cam $d$.

At one side of the receiving end of the measuring-table is a horizontal rack-bar $l$, and fixed to the hanger I is a stud $k$, on which is a grooved roller $k'$, adapted to bear upon the rack-bar, and thereby hold the same in position and in engagement with the idle segmental gear $g$, said rack-bar being bolted to a trussed connecting-rod $m$, (shown in Fig. 2,) to the opposite end of which is bolted the carriage, which I will hereinafter fully describe.

On the under side of the rack-bar $l$ is a holdback latch-hook $n$, which is held in position by a bolt $n^2$, the opposite end of said latch-hook being provided with a curved arm $n^3$, adapted to prevent the hook from dropping down too far by coming in contact with the trussed rod $m$.

Depending from the sides of the main frame are suitable hangers $A^3$ for a transverse shaft $A^4$, on which are mounted the arms $A^5$ $A^6$, the latter of which have the adjustable weights $A^7$, and in the arms $A^5$ is mounted a shaft $A^8$, carrying a pulley $A^9$, which engages the under rim of the belt. This arrangement forms a belt-tightener for keeping the measuring-belt under the proper tension.

Referring now to the middle division of the machine—namely, the portion thereof which includes the cutting appliances which sever the column of clay into pieces or blocks—$A^9$ represents suitable channel-bars which form the skids or base of the cutting-machine frame, said channel-bars being united by a transverse frame $A^{10}$ at one end and by the worm-gear casing $A^{11}$ at the opposite end, said frame and casing having journal-bearings $A^{12}$ $A^{13}$, in which is mounted a long longitudinally-extending shaft $A^{14}$, on which are keyed two long pinions $A^{15}$. On the front end of the shaft $A^{14}$ is mounted a worm-gear $A^{16}$, Fig. 3, which is driven by a worm located in a casing at $A^{17'}$ and mounted on the driving-shaft $A^{17}$. The channel-bars $A^9$ also have bolted to them or are otherwise provided with four track-bearings M', which support the axles $m^2$ of the carriage, said axles having the wheels $m^3$, on which the carriage rolls in V-shaped tracks $M^4$, as shown in Fig. 3, and to the ends of the tracks are bolted or fixed the gear housings or covers N', which constitute the end frames of the carriage, said housings or covers being tied together at the top by a cross-bar $N^2$. In the gear housings or covers N' are bolted or fixed the eccentric studs $N^3$, on which are mounted the rollers $N^4$, which carry geared rings $N^5$, one of which is located in each of the housings or covers at the end of the carriage division of the machine. The studs $N^3$ are eccentrically mounted and are so made that means of adjustment are provided to take up the wear and also adjust the teeth of the geared rings $N^5$ properly in the teeth of the long pinions $A^{15}$, which construction and operation will be fully understood by reference to Figs. 5 and 6. By reference to said figures it will also be seen that three eccentric pins are employed in each housing or cover and that each pin is provided with a roller $N^4$, and bolted to the housing N' are the drop-hangers $o$, which support a shaft $o'$, on which are a number of push boards or hangers $o^2$, to the bottom of which are bolted the platens or supports $o^3$, said platens and push-boards being designed to support the column or bar of clay while it is being severed by the cutting-wires which I will presently describe. In actual practice the width of the push-boards and platens is regulated by the thickness or length the material is to be cut, and the total number of boards and platens is the multiple of the circumference of the measuring-drum $a'$ plus the thickness of the total number of cutting-wires required.

Referring to Figs. 7, 8, and 9, wherein the push-boards and platens are shown in detail, it will be seen that the push-boards $o^2$ are formed or provided with hubs $o^4$, which are bored to fit the longitudinal shaft $o'$ and are held in position by set-screws at $o^5$. Suitable distance-posts $o^6$ are cast or formed as a part of the web $o^7$, and on the opposite side of the web from these posts is an annular hub $o^8$, which rests against the ends of the distance-posts and forms a track or channel for the rings $o^9$, which carry the cutting-wires. On one edge and the lower end of the webs $o^7$ are formed or secured the plates $o^{10}$ $o^{11}$, one at right angles to the other, the former acting as push-boards or to prevent the bar or column of clay from sliding laterally while the cutting-wires are passing through them and the plates $o^{11}$ having bolted to them the platens $o^3$, which are designed to support the bar of clay while it is being severed.

In Fig. 10 I show the shaft $o'$, on which the foregoing push-boards and platens are mounted, said shaft having an end turned down and provided with a nut 2, also a key 3. This provides means for attaching the shaft to the hangers $o$, and the key prevents the shaft from turning.

The wire-carrying rings $o^9$ are each of the form shown in Fig. 11 and has such thickness as to substantially equal the width of the space between the distance-posts $o^6$ and the web $o^7$, said rings each being provided with two oppositely-facing hooks $o^{12}$, over which a loop in the end of the wire passes, said wire being then passed around and back of other hooks $o^{13}$ on said rings and extending opposite to the projection of the hooks $o^{12}$.

By mounting the wires in the manner described they are properly spaced to correspond with the grooves or spaces $o^{14}$, formed by placing two of the push-board sections $o^2$ together, which enables the cutting-wire to pass between the boards and protect the bar of clay from being broken while being severed.

The rings $o^9$ are carried around by the tension of the wires, one of which is strung on each side, as shown in Fig. 4 at $o^{15}$.

Bolted to each geared ring $N^5$ and running parallel with the carriage are two shafts $o^{16}$, Fig. 4, on which are mounted a series of wire attachments to support the outer ends of the wires, one of said attachments being shown in detail in Figs. 13 to 15, without, however, the hook and spring, which will be hereinafter described. By reference to Figs. 13 to 15 it will be seen that the wire attachments each consists of a collar $o^{17}$, which is held in position by set-screws at $o^{18}$ and has a projection $o^{19}$, to which is hinged or pivoted a forked casting $o^{20}$, one end of which is provided with a square corner $o^{21}$, the object of which is to prevent the casting from falling below a horizontal position by coming in contact with the collar $o^{17}$. The opposite end of the casting $o^{20}$ is enlarged and provided with a square hole $o^{23}$ to receive a square rod with a hook on one end. The opposite end of this rod is forged round, and a thread is cut on the same to receive the thumb-nuts $o^{24}$, said enlarged end of the casting serving as a seat for a spring $o^{25}$, which is designed to yield when the wire is under tension, the thumb-nuts providing means for adjusting this tension and the guides $o^{26}$ serving to keep the wires in proper position. From this description it will be apparent that when the casting $o^{20}$ is in a horizontal position it permits the wire to be placed in position, and when the casting is turned from the said horizontal position into a vertical position, as in Fig. 14, the wire will be tightened by the casting swinging about its pivot $o^{27}$. The collar $o^{17}$ is also provided with a projection $o^{28}$, to which is riveted a small flat spring $s$, which extends to a stud $o^{29}$ on the casting $o^{20}$ for the purpose of preventing the casting from dropping down into a horizontal position should the wire become detached or broken.

Bolted to the front gear-housing $N'$ is a wide support or platen $o^{30}$, and bolted to the rear gear-housing is a similar support or platen $o^{31}$, and $o^{32}$ is an apron one end of which is bolted to the support $o^{31}$, while the opposite end is supported by an adjustable rod-hanger $o^{33}$, said supports and apron supporting the bar of clay and the severed portions thereof or bricks as they pass from the cutting appliances to the separating-table.

Bolted to each of the gear-housings and located in the vertical central plane thereof and disposed equidistant from the shaft $o'$ are two bars $p'$, to which are attached the trip-shoes $p^2$. (Shown particularly in Fig. 4.) In connection with these shoes I employ a trip-saddle $p^3$, which consists of a web $p^4$, having upon its upper edge an apron or saddle $p^5$ and a divided hub $p^6$, which forms a bearing for the shaft $A^{14}$, said trip-saddle being also provided with a hinge $p^7$, to which is attached an arm $p^8$, which forms the lower member of the saddle, said saddle having near the outer ends of its members two lugs or bosses $p^9$, through which passes a bolt $p^{10}$, which carries a spring $p^{11}$, whereby the upper arm of the saddle may yield when the trip-shoe strikes the upper curved face of the saddle. The lower arm or member $p^8$ of the saddle is extended far enough to strike the trip-lever $p^{17}$, which is mounted on the shaft $p^{18}$, supported in appropriate bearing $p^{19}$, bolted to the base channel-irons $A^9$, and bolted to the track-iron $M^4$ is a plate $p^{12}$, to which is fastened, pivoted or hinged, at $p^{14}$, a trip-dog $p^{13}$, which is held in position when it engages the roller $p^{16}$ by a pin $p^{15}$. On the end of the shaft $p^{18}$ opposite to the trip-lever $p^{17}$ is a segmental lever $p^{20}$, which is designed to operate a double-cone sleeve $p^{21}$, provided with annular grooves $p^{22}$, in which the teeth of the segmental lever engages, and at each end of the cone-sleeve $p^{21}$ are conical heads $p^{23}$ and $p^{24}$. An angle-iron $p^{26}$ is bolted to the channel-iron base $A^9$ and prevents the lower member or arm of the saddle from dropping down lower than necessary.

In Figs. 16 and 17 I illustrate a brake mechanism which is used in connection with the balance of my machine, and this comprises a hanger $r'$, which is bolted to the worm-gear housing $A''$, said hanger supporting one end of a brake-shaft $r^2$, the opposite end of which is supported in a hole made in the casing $A''$. The brake-shaft is made square, turned down on each end to form suitable journals, and on this shaft is mounted a brake-lever $r^4$, at the outer end of which is a take-up screw $r^5$, provided with a lock-nut $r^6$. On the brake-shaft is also mounted a casting $r^7$, having two sets of arms or projections $r^8$ and $r^9$, through each set of which passes the bolts $r^{10}$ and $r^{11}$, adapted to hold each end of the brake-band, said band passing around the brake-pulley $r^{13}$, mounted on the shaft $A^{17}$. A set-collar $r^{14}$, mounted on the shaft $A^{17}$, determines the distance that the double-cone sleeve $p^{21}$ shall travel on the shaft, and the aforesaid take-up screw $r^5$ and its lock-nut regulate the amount of pressure which the brake-band shall apply to the brake-pulley.

In Figs. 18 and 19 I illustrate a friction-clutch mechanism which I have found well adapted for the purposes of my machine and which consists of a flanged pulley $q'$, having a hub $q^2$ projecting to one side, the inner surface of the flange of the pulley being dressed true with the outer face. The pulley runs loose on the shaft $A^{17}$ and is operated by a driver $q^{13}$, having a hub which is keyed to the shaft and provided with two arms, to the outer end of one of which is screwed a stud $q^4$ with a nut $q^5$, said stud carrying an expansion-lever $q^6$, having a set-screw $q^7$, which affords means of adjusting the friction ring or driver the proper tension to drive the pulley and its adjuncts.

On the outer end of the lever $q^6$ is a rectangular portion $q^8$, which receives a bolt $q^9$, which passes into a hole in an enlargement on the outer end of the driver $q^{13}$. On the inner surface of the pulley is also a split expansion-ring $q^{10}$, having an inwardly-projecting lug $q^{11}$, which affords means for connecting the driver $q^{13}$. The divided ends of the expansion-ring are provided with two inwardly-projecting jaws or projections $q^3$, between which the rectangular portion $q^8$ operates to spread the jaws, and thereby expand the friction-ring, the conical end $p^{24}$ of the double cone $p^{21}$ affording means for tightening or loosening the ring through the medium of the lever $q^6$.

From the arms of the friction-pulley also projects an annular ring or pulley $q^{14}$, from which a band or belt S runs to revolve the pulley $s'$, mounted on the shaft $s^2$, to which is keyed a pinion $s^3$, which drives a spur-gear $s^4$, fixed to the shaft $s^5$. On this latter shaft is mounted a drum or pulley $s^6$, which carries an apron $s^7$, the speed of which is slightly in excess of the travel of the bar of clay, whereby the severed portions of the latter are separated to allow the workmen to better remove them.

Referring now to the third division of my machine—namely, that part upon which the severed portions of the bar of clay are delivered from the cutting appliances—it will be seen that the aforesaid separating belt or apron $s^7$ is supported by a series of rollers $s^8$, whose shafts run in appropriate bearings on the framework or table $s^9$, the outer end of which will be provided with a take-up pulley of any suitable type to regulate the tension of the belt. The table $s^9$ is mounted on suitable standards $s^{10}$, which are in turn mounted upon the skids $s^{11}$, and the shafts $s^2$ and $s^5$ are supported in journal-bearings $s^{12}$ $s^{13}$ and $s^{14}$ $s^{15}$, which form a part of the standards $s^{10}$, and the shaft $s^2$ is extended beyond one side of the frame and is supported by a floor-standard $s^{16}$, as shown in Fig. 2. Keyed to the end of the shaft $s^5$, opposite to the gear-wheel $s^4$ thereof, is a friction-pulley $t$, having clamping-flanges $t'$ $t^2$, said pulley engaging the periphery of a wheel $t^3$, which has a segmental peripheral portion extending from the point $t^4$ to the point $t^5$, said wheel being mounted loosely on a stud-bolt $t^6$, provided with a nut $t^7$ and screwed into a bar $t^8$, as shown at $t^9$. In one of the arms of the wheel $t^3$ is fitted a wrist-pin $t^{10}$, provided with a suitable shoulder and nut to keep the lever $t^{11}$ in its proper position, said lever having an elongated hole $t^{12}$ in one end adapted to receive the wrist-pin $t^{10}$ and having its opposite end secured by a bolt $t^{14}$, which serves as a wrist-pin to hold the lever to the back end of the gear-housing $N'$. The bar $t^8$ has one end enlarged at $t^{15}$, and through this end passes a bolt $t^{16}$, which secures the bar to the back end of the cross-frame $A^{10}$, and the opposite end of the bar is made wider and is provided with an elongated hole $t^{17}$. An upright $t^{18}$, bolted to the table $s^9$ and skids $s^{11}$, has projecting from its face a post $t^{19}$, through which passes a lock-bolt $t^{20}$, on which screws a lever-nut $t^{21}$, which affords means for clamping the bar $t^8$ to the upright. Immediately below the post $t^{19}$ and to the face of the upright and a part of the same is a guide $t^{22}$ and also a rest $t^{23}$, between which is placed a hand-wheel $t^{24}$, the hub of which is threaded and in which is screwed the adjusting-screw $t^{25}$. This arrangement affords means of adjusting the wheel $t^3$ so that the segmental periphery between the points $t^4$ and $t^5$ has the necessary pressure against the friction-pulley $t$ to drive the wheel, which in turn returns the carriage of the middle or cutting division of the machine to its proper position.

In order to lubricate the column of clay as it passes from the measuring-table to the cutters, I employ the following as a preferred mechanism: An oil-receptacle O is provided with felt-covered rollers $O^2$, which dip into the oil and have their gudgeons supported in spring-bearings at $O'$, such bearings being used to cause the rollers to press slightly on the bottom of the bar of clay as it passes over the rollers, and thereby transfer a small amount of oil thereto. $O^3$ is a vertically-disposed roller rotatably mounted on a bolt $O^4$, which passes through a suitable supporting-frame $O^5$, carried by a stud $O^6$, which is fixed in the oil-receptacle. The oil-reservoir $O^7$ is supported by a stud $O^8$, which is fixed in the oil-receptacle O, and suitable drip-pipes $O^9$ and $O^{10}$ are provided with drip-cocks $O^{11}$ and $O^{12}$ to regulate the proper amount of oil necessary to lubricate the bar of clay on the bottom and side to prevent the clay from adhering to the rollers $O^2$ $O^3$. This lubricating mechanism is well known and forms no essential part of the present invention, and it and the specific clutch mechanism before described may be changed and other forms substituted without departing from the scope of the invention.

To enable the table to be revolved by hand when not in action, I employ a collar P, (shown in Fig. 3,) said collar being mounted on the driving-shaft $A^{17}$ and provided with several holes in its periphery for the admission of an appropriate tool or bar.

From the foregoing description the operation of my machine will be understood; but to make cutting operations particularly plain I will now describe the movements of the parts during one complete operation. As the bar of clay issues from the die of the brick-machine it is received on the measuring-belt $B'$, which imparts rotation to the measuring-drum, and this in turn rotates the cam $d$, which carries the registering-dog $e^4$ and roller $e^3$ until the said dog strikes the projection $g^2$ on the segmental gear $g$, (at which time the offset in the track of the cam $d$ permits the roller $j^6$ to release the holdback-hook $n$ from the holdback-dog $j$,) which locks the gear, through the cam $d$, to the shaft $a^2$ and moves the carriage in register with the bar of clay through the gear $g$, rack-bar $l$, and trussed connection $m$. As the carriage moves with the bar of clay the trip-dog $p^{13}$ engages the roller $p^{16}$ and forces the lever $p^{17}$ down, rocking the trip-shaft $p^{18}$ and shifting the double-cone sleeve $p^{21}$, which disengages the brake-band through the shaft $r^2$ and lever $r^4$ and engages the friction driving-pulley through the expansion-lever $q^6$, the expansion-ring $q^{10}$, and the flange-pulley $q'$, which rotates the shaft $A^{17}$ and its worm, the worm-gear $A^{16}$, pinion-shaft $A^{14}$, and the long pinions $A^{15}$, which in turn revolves the geared rings $N^5$, which carries the wire bar $o^{16}$, with this series of wires $o^{15}$, through the bar of clay and to the position marked $x\ x$ in Fig. 4 and at which time the trip-shoe $p^2$ strikes the saddle $p^3$ and tilts the arm $p^8$ until the end strikes the trip-lever $p^{17}$, rotating the shaft $p^{18}$ and shifting the sleeve $p^{21}$ until the friction driving-pulley is released and the brake-band is actuated to stop the rotating wire frame from moving past the point indicated at X X. As the bar of clay moves out (after the brick are severed) through the measuring mechanism described the carriage travels until the roller $e^3$ disengages from the stationary cam $i$ at the end of the track of the cam at the point marked $x\ x\ x$ on Fig. 1. In the meantime the cam $d$ has revolved far enough to reset the holdback-dog $j'$. When the carriage is in the position last described, the connecting-rod $t^{11}$ has turned the wheel $t^3$ until the periphery of this wheel comes in contact at $t^{14}$ with the friction-roll $t$, when the wheel is revolved and through the lever $t^{11}$ returns the carriage to its original position, when the hook $n$ drops into its proper position and holds the carriage until the measuring-drum registers enough of clay for the next operation. As the bar of clay moves over the rollers $O^2$ $O^3$ it pushes the brick over the supports $o^{31}$ $o^{32}$ onto the separating-belt $s^7$, which conveys the brick to the off-bearers.

My machine is automatic in its operation. The moving bar of clay controls the mechanism. The design of the parts is such that the bar of clay will not become distorted in setting the machine in operation. I drive the machinery from an independent motive power, so as to relieve the bar of clay. The measuring-table is as free from friction as possible, whereby it may be made as short as possible without permitting the bar of clay slipping on the measuring-belt, thereby registering the amount of clay each time, for if a slippage of the bar of clay does occur while the wires are passing through the clay the wires will cut the brick in a curved or irregular manner, and the table is capable of adjusting itself to the irregular movement of the bar of clay and accommodate itself to the minimum and maximum capacity.

Having thus described my invention, what I claim as new, and desire to secure by Letters Patent, is—

1. In a brick and tile cutting machine; the combination with cutting appliances, of a measuring mechanism upon which the bar of clay is received said mechanism comprising a measuring-belt and end drums therefor, a cam on the axis of one drum, and rotating therewith; a registering-dog mechanism carried by the cam, a normally idle segmental gear loose on the axis of the drum and provided with a projection, and a reciprocable rack-bar engaging with the gear said gear having its projection disposed in the path of movement of the dog whereby the gear is caused to travel with the dog and impart a movement to the rack-bar.

2. In a brick and tile cutting machine the combination of a measuring-belt upon which the bar or column of clay is received; end drums over which the belt passes; shafts for said drums; a cam fixed to one of said shafts; a registering-dog carried by the cam; a segmental gear normally stationary relative to the cam and its dog and having a part disposed in the range of movement of the latter whereby during the rotation of the cam the dog and gear interlock and travel together; and a rack-bar movable in one direction by the gear.

3. In a brick and tile cutting machine the combination with a reciprocable carriage and cutting appliances carried thereby, of means for measuring the bar of clay comprising a traveling surface upon which said bar is received, a rack-bar connected with the carriage and a gear operatively in engagement therewith, a rotatable member operating in unison with the said traveling surface and means on the gear disposed in the range of movement of the rotatable member and engaged by the latter during a portion of its movement whereby the gear is caused to rotate with said member and impart a reciprocable movement to the rack-bar and carriage in unison with the advance of the bar of clay.

4. In a brick and tile cutting machine the combination with a reciprocable carriage and cutting appliances carried thereby, of an endless traveling belt upon which the bar of clay is received; end drums around which the belt passes one of said drums having a circumference about equal to the length of the bar of clay to be cut; a rack-bar connected with the carriage and maintained stationary therewith during the first part of the travel of the bar of clay; a periodically-movable, segmental gear; a continuously-rotating cam operating in unison with the measuring-drum; and means whereby the cam and gear interengage and move in unison during another part of the advance of the bar of clay whereby a corresponding movement is given the rack-bar and carriage.

5. In a brick and tile cutting machine the combination with a reciprocable carriage and cutting appliances carried thereby; of a measuring-belt and end drums therefor, a longitudinal bar extending from the carriage, a latching mechanism for holding the bar and carriage against longitudinal movement, an idle member operatively connected with the bar and capable of an axial movement, a rotating member on the axis of the idle member and operating in unison with the measuring-belt and adapted to actuate the latching mechanism and release the longitudinal bar from its locked position said rotating and idle members having interengaging parts whereby the former is periodically moved to advance the carriage longitudinally in register with the bar of clay.

6. In a brick and tile cutting machine, the combination with a reciprocable carriage and cutting appliances carried thereby, of a measuring-belt and end drums therefor, shafts upon which the drums are mounted, a cam fixed to one of said shafts, a normally idle segmental gear loose on said shaft and provided with a lug or projection, an immovable cam, a register-dog mechanism comprising a crank-shaft and a roller on the crank end thereof and adapted to travel upon the said immovable cam, and a dog on the opposite end of the crank-shaft and adapted to engage the projection on the loose gear whereby the gear and first-named cam travel together, and a rack-bar in operative engagement with the segmental gear and also connected to the carriage whereby a reciprocal movement is given to the latter.

7. In a brick and tile cutting machine the combination with a carriage and cutting appliances mounted thereon; of a rack-bar extension of said carriage; a holdback latch-hook carried by said rack-bar; a measuring-belt and end drums therefor; shafts upon which the drums are mounted; a cam fixed to one of said shafts and provided with an offset portion; an idle gear loose on the said shaft; a register-dog mechanism between the cam and gear and including a rock-shaft and a dog thereon adapted to interengage with the idle gear and impart movement thereto; a pivotally-mounted holdback-dog having a hook to engage the said holdback latch-hook and having one end in operative contact with the said cam said holdback-dog counterweighted to disengage its hooks from the latch-hook when the offset portion of the cam arrives opposite the adjacent end of the dog whereby the carriage is released to allow the gear to impart a reciprocal movement to the rack-bar extension thereof.

8. In a brick and tile cutting machine the combination with a carriage and cutting appliances mounted thereon, of a measuring-belt and end drums therefor, shafts for the drums, a cam fixed to one of said shafts, a latching mechanism between the cam and an extension of the carriage and comprising interengaging hook members normally in locked engagement, one of said members having a portion in contact with the cam to hold the parts locked and having a second portion weighted, said cam having an offset portion to interrupt the contact of the cam with the said hook member and allow the weighted portion of the latter to release the hook members from their locked engagement, and means operated by the cam for imparting movement to the carriage.

9. In a brick and tile cutting machine, the combination with a carriage and cutting appliances mounted thereon, of a measuring-belt and end drums therefor, one of said drums having a circumference about equal to the length of the bar of clay to be cut, a disk loose on the shaft of the last-named drum, a segmental gear adjustably fixed to the disk and provided with a projection, a rack-bar engaged by said gear, a stationary cam, a cam fixed to said shaft, a crank-shaft having one end in contact with the stationary cam and having the other end passing through the other cam and provided with a dog said dog adapted to interlock with the projection on the gear whereby the latter travels with the second-named cam during a portion of the movement of the latter and imparts movement to the carriage.

10. In a brick and tile cutting machine the combination of a framework; shafts mounted thereon; drums on said shafts; a measuring-belt passing around the drums; a hanger fixed to the main frame; a stationary cam fixed to the hanger; a cam fixed to one of the drum-shafts; a gear loose on said drum-shaft; a crank-shaft carried by the second-named cam, having one end engaged by the first-named cam; a dog on the opposite end of the crank-shaft, said gear having a projection in the range of movement of the dog, a rack-bar engaged by the gear; and a latching mechanism between the rack-bar and the second-named cam and controlled by the latter.

11. In a brick and tile cutting machine the combination with a reciprocating carriage, cutting appliances mounted thereon, and means for feeding a bar of clay into the range of action of the cutting appliances, of means for operating the cutting appliances comprising a rock-shaft having a member in the path of the carriage and actuated thereby, a normally idle driving-shaft and geared connections between the same and the cutting appliances for imparting a rotary movement to the latter, a brake mechanism having a member fixed to the shaft said brake mechanism holding the shaft and cutting appliances normally inactive, a clutch mechanism comprising a constantly-driven loose member fixed to said shaft, and a shifting sleeve on the shaft and actuated by the rock-shaft to simultaneously release the brake mechanism and connect the constantly-driven member with the shaft whereby the geared connections and cutting appliances are operated.

12. In a brick and tile cutting machine, the combination with a reciprocable carriage provided with cutting appliances; of a driven shaft; geared connections between the same and the cutting appliances, for imparting rotation to the latter; a clutch mechanism on the shaft including a constantly-driven loose member and a member fixed to the shaft; and means for connecting the shaft and the constantly-driven member of the clutch comprising a rock-shaft having a lever-arm extended into the range of movement of the carriage; a member on the carriage for tripping said lever and rocking the shaft; a shifting sleeve on the driving-shaft said rock-shaft having a member operatively connected with the sleeve; and an expansible member actuated by the sleeve and frictionally connecting the constantly-driven member of the clutch with the driven shaft.

13. In a brick and tile cutting machine, the combination with a reciprocable carriage provided with cutting appliances, of a driven shaft, geared connections between the same and the cutting appliances, a friction-clutch mechanism on the shaft comprising a constantly-driven loose member and a companion member fixed to the shaft, an expansible member for connecting the constantly-operating member with the companion fixed member, and means for operating the expansible member comprising a rock-shaft, a lever-arm thereon and projected into the range of movement of the carriage, a dog on the carriage and adapted to trip the lever-arm and rock the shaft, a shifting sleeve on the driven shaft and connections between the same and the expansible member of the clutch, said sleeve having circumferential grooves forming a rack-surface, and a second lever-arm on the rock-shaft having a segmental toothed head to operatively engage the rack-surface of the sleeve and thereby move the sleeve longitudinally along the driven shaft.

14. In a brick and tile cutting machine the combination with a reciprocable carriage and cutting appliances thereon, of a driving-shaft, a friction-clutch thereon, means including a rock-shaft actuated by the carriage and a shifting sleeve on the driving-shaft and actuated by the rock-shaft, for rendering the clutch operative and inoperative, rotatable geared rings carrying the cutting appliances, driving-gears for said rings, and a worm and worm-gear connection between the driving-shaft and the said driving-gears.

15. In a brick and tile cutting machine the combination with a carriage and cutting appliances carried thereby, and a power-driven shaft and connections between the same and the said appliances, and means for stopping the movement of the cutting appliances comprising a clutch mechanism and means for releasing the same; a brake-wheel on the shaft, a brake-band encircling said wheel, a rock-shaft, a lever-arm thereon and connected to the brake-band said band having one end fixed, and means automatically controlled by the cutting appliances for actuating said lever and applying the band to the brake-wheel.

16. In a brick and tile cutting machine, the combination with a carriage, of annular housings forming the end frames thereof, rotatable rings in the housings, cutting appliances carried by the rings, means including a power-driven shaft and connections for rotating the rings, and means for stopping the rotation of the rings comprising a clutch and means for releasing the same, a brake, a clutch-actuating member slidable on the shaft and controlling said brake, a rock-shaft and connections for actuating the slidable member, a lever extending from the rock-shaft, means engaging said lever and rocking the shaft in one direction, to release the brake, and means including a rocking saddle and a trip member on a geared ring for rocking said shaft in a reverse direction, and thereby setting the brake and releasing the clutch.

17. In a brick and tile machine the combination with a carriage having rotatable rings at the ends and cutting appliances carried by the rings, of a longitudinally-extending rock-shaft, a transversely-extending power-driven shaft, gear connections between the latter shaft and the said rings, a brake mechanism and a friction-clutch mechanism on said transverse shaft, a slidable member between the brake and clutch, a connection between the rock-shaft and said member, means comprising a lever on the rock-shaft and a trip on the carriage for rocking the shaft in one direction and moving the sliding member so as to apply the clutch and release the brake, and means including a trip member on a geared ring and a rocking saddle engaged thereby and projected into the path of the lever for rocking the shaft in an opposite direction and moving the slidable member to release the clutch and apply the brake.

18. In a brick and tile cutting machine the combination with a carriage and cutting appliances mounted thereon, and a power-driven shaft and connections for operating the cutting appliances, of a friction-clutch and a positive brake both on the said shaft and means automatically controlled by the machine for simultaneously releasing the friction and applying the brake, and vice versa.

19. In a brick and tile cutting machine, the combination with a carriage, annular housings forming end frames therefor, toothed rings in said housings, pinions for operating the rings, and cutting appliances carried by the rings, of studs fixed in the housings, and rollers on the studs and supporting the rings said studs having eccentric portions whereby they may be adjusted to take up the wear and adjust the teeth of the rings in the teeth of the pinions.

20. In a brick and tile cutting machine, the combination with a carriage, cutting appliances mounted thereon, and means for advancing the carriage in one direction in unison with the movement of the column of clay, of means for returning the carriage to its normal position including a constantly-operating friction-wheel, a friction-wheel to engage therewith and a connection between carriage and the second-named wheel said second wheel having a portion of its periphery reduced and out of operative contact with the constantly-operating gear to allow the carriage to be moved in its outward direction and having the remaining portion of its periphery to engage said constantly-operating wheel at the conclusion of the outward movement of the carriage whereby the carriage is positively returned.

21. In a brick and tile cutting machine, the combination with a reciprocable carriage provided with cutting appliances, means for feeding the column or bar of clay to the carriage, means for advancing the carriage in unison with the advance of the bar of clay, and means for reversing the motion of the carriage and returning the carriage to its normal position, including a push-bar connection from the carriage, a wheel having a wrist-pin to engage the outer end of said connection, said wheel having a portion of its periphery provided with a friction-surface, a separating-belt upon which the bricks or tiles are delivered, a friction-roller actuated in unison with said belt and into contact with which roller the friction-surface of the wheel is adapted to be brought at the completion of the outward travel of the carriage whereby said carriage is returned to its normal position.

22. In a brick and tile cutting machine, the combination with a reciprocable carriage provided with cutting appliances, and means for advancing the carriage in one direction, of a separating-belt upon which the severed bricks or tiles are delivered, a shaft and connections for operating the belt, a friction-wheel on said shaft, a second wheel having a portion of its periphery to disengage said first-named wheel when the carriage is moving outwardly, a push-bar connection between second-named friction-wheel and the carriage whereby the former is rotated out of operative connection with the first-named wheel during the outward movement of the carriage, said second-named friction-wheel having another portion of its periphery to be advanced by the carriage and connection into operative contact with the first-named friction-wheel whereby the carriage is returned to normal position.

23. In a brick and tile cutting machine, the combination with a reciprocable carriage provided with cutting appliances, and means for advancing the carriage in one direction, of means for returning the carriage to normal position including a friction-wheel operated by the carriage and having a segment of its periphery forming a friction-surface, and a constantly-operating friction-wheel into contact with which said friction-surface of the first-named wheel is brought at about the conclusion of the outward travel of the carriage; and means for adjusting the first-named wheel relative to its companion comprising a pivoted lever upon which said first-named wheel is mounted, a guided connection for the opposite end of the lever, an adjusting-screw engaging the said opposite end of the lever, and means for locking the lever in its adjusted position.

In testimony whereof I have hereunto set my hand in presence of two subscribing witnesses.

WILLIAM R. CUNNINGHAM.

Witnesses:
FRED H. HART,
J. L. SECRIST.